Nov. 4, 1924. 1,513,856
L. POETON
OPHTHALMIC MOUNTING
Filed Aug. 5, 1920
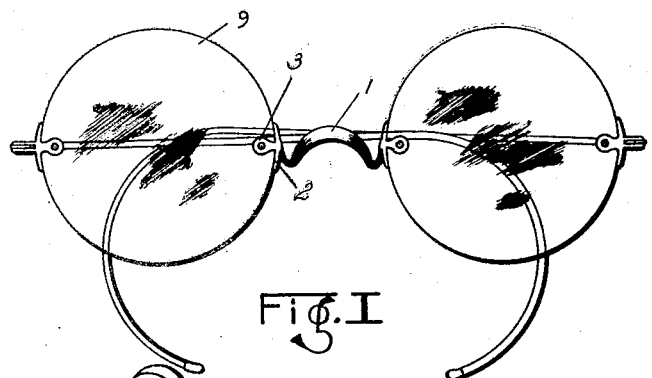
Fig. I
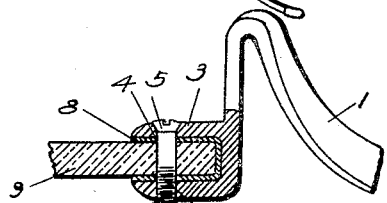
Fig. II
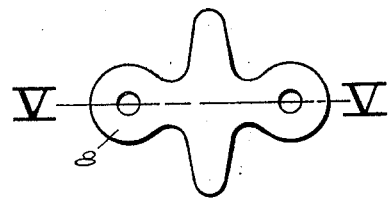
Fig. IV
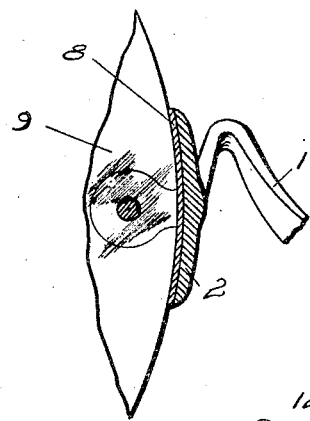
Fig. III
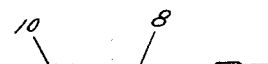
Fig. V
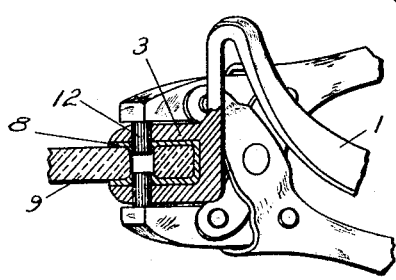
Fig. VI
INVENTOR
LAWRENCE POETON
BY
H. H. Styll & H. K. Parsons
ATTORNEYS Patented Nov. 4, 1924.

1,513,856

UNITED STATES PATENT OFFICE.

LAWRENCE POETON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed August 5, 1920. Serial No. 401,410.

*To all whom it may concern:*

Be it known that I, LAWRENCE POETON, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings and has particular reference to what is commonly termed a rimless mounting.

One of the principal objects of the present invention is the provision of a novel and improved manner of satisfactorily securing a lens in position within a rimless mounting to resist loosening of the lens within the mounting to a maximum degree.

A further object of the present invention is the provision of a novel and improved form of cushioning member for use in connection with a rimless mounting which will tend to relieve the lens of the strain due to direct clamping of the metal thereagainst, as is ordinarily employed, and will also serve to lock the lens against accidental loosening movement.

A further object of the invention is the provision of a novel and improved process or method of mounting rimless lenses within metallic clips to compensate for any variations in the relationship of the parts as originally constructed.

Other objects and advantages of my improvement should be readily apparent by reference to the following specification taken in connection with the accompanying drawings, and it will be understood that I may make any modifications in the specific details of construction shown and described within the scope of the appended claim without departing from or exceeding the spirit of my invention.

Figure I represents a front view of a mounting embodying my improvements.

Figure II represents a horizontal sectional view.

Figure III represents a vertical sectional view with the clip ear removed.

Figure IV represents a plan view of the liner used in my construction.

Figure V represents a sectional view taken as on the line V—V of Figure IV.

Figure VI represents a detail view of one method of employment of my improvement.

In the drawings, the numeral 1 denotes the ordinay spectacle or eyeglass bridge, which may be of any desired construction, and which is shown as provided at each end with a lens clip comprising a strap portion or shoe 2 and a pair of substantially parallel ears 3. One of these ears is provided with a countersunk aperture 4 to receive the head 5 of the lens screw, and the other of said ears is provided with the threaded aperture 6 to receive the threaded stem or shank portion 7 of said screw.

In the ordinary mounting of ophthalmic lenses a clip of this general type is employed, the lens being placed directly within the clip and the ears being brought together through the use of pliers or the like to tightly grip the lens, and secured in position as though the use of the screw member 7, as is illustrated in Figure II. This feature, however, has involved certain difficulties, since an undue tightening of the clip ears will introduce strain in the lens rendering it liable to later break at the portion clampingly held, while on account of the rigidity of the metal there is no allowance for any possible contraction or expansion of the parts, or in other words no give to the joint, so that should the metal expand the joint becomes loosened, or should it contract an additional and undue strain is placed on the lens. Also in mounting the lens in the ordinary manner extreme care and accuracy is necessary in order that the lens may be tightly held, particularly by the shoe portions 2. If these do not tightly engage the lens, as when the lens is drilled a little too near the edge, or the shoe is not properly fitted, there will be a play allowing the lenses to tilt or droop, a serious defect in cases where cylindrical or toric lenses are prescribed.

These defects are all very largely eliminated through the use of my improvement, which consists in interposing a liner 8 between the metal clip and the lens 9, this liner being formed from material commercially known as zylonite or other composition having similar properties. The advantage of this material is that it is of a yielding or resilient character capable of being compressed or displaced as desired in the fitting of the lens, especially if softened through the influence of heat, yet at the same time is possessed of sufficient rigidity and permanency to satisfactorily engage and hold the lens when set and clamped in place by the metal clip. In addition its yielding character is sufficient to relieve the lens from the clamping strain of contact of the metal, more evenly distributing the strain, while at the same time there is less tendency towards slipping of the glass through engagement of the zylonite therewith than there is of slipping when directly engaged by the metal.

A further and most important feature of this zylonite liner is its pliability and ready working, in that it may be easily slightly thinned down, as when the lens is drilled too far from the edge, or filled into the lens screw hole as when the lens is drilled too near the edge to make a tight fit between the clip and lens so the lens will be most securely held in place. One formation of the construction is clearly illustrated in Figures II and V, in which it will be seen that the liner 8 is provided with the bosses 10 surrounding the screw receiving apertures 11. In use the liner is perferably shaped to fit within the strap and softened under the influence of heat when it is placed in position between the lens and strap, the strap ears suitably tightened in position and there locked through the use of the screw 7. This clamping or tightening forces the material of the boss against the juncture of the clip face and screw and against the screw receiving aperture in the glass, tending to lock the screw against accidental loosening movement when the zylonite has become set and also the zylonite filling in the clearance between the screw and screw receiving aperture in the lens so as to hold the lens against any possible loosening movement.

Attention is directed to Figure V wherein the bosses 10 are projected upon both sides of the liner, the projections on one side interlocking with the strap and the projections on the other side interlocking with and cushioning the lens.

If preferred, in place of forming the blank as illustrated in Figure V, with the bosses at the screw receiving apertures, the blank may be shaped and placed between the clip and lens and suitably shaped hot pliers employed having the portions 12 adapted to pass through the apertures 6 to press out the portion of the liner material coinciding with the lens screw receiving apertures in the lens and clip, pressing out the liner in the direction of the lens, the pressed out portion tending to bend over the edge and fill in the screw receiving aperture, particularly if the aperture is not exactly correctly drilled and alined, the zylonite or other composition liner as forced in tending to compensate for the incorrect drilling of the lens so that the lens will be securely and firmly held, as should be apparent by reference to Figure VI.

I claim:

A blank for a lens strap liner comprising a strip of flexible material having lens screw apertures formed therethrough and having bosses surrounding the apertures on both sides whereby the projections to one side will interlock with a strap to retain the liner in position prior to mounting and the bosses on the opposite side will interlock with and cushion the lens when the device is in operative position.

In testimony whereof I have affixed my signature, in presence of two witnesses.

LAWRENCE POETON.

Witnesses:
ALICE G. HASKELL,
H. K. PARSONS.